United States Patent
Brodt et al.

(10) Patent No.: US 11,132,388 B2
(45) Date of Patent: *Sep. 28, 2021

(54) EFFICIENT SPATIAL QUERIES IN LARGE DATA TABLES

(71) Applicant: International Business Machines Corporation, Armonk, NY (US)

(72) Inventors: Andreas Brodt, Gerlingen (DE); James L. Finnie, Boeblingen (DE); Knut Stolze, Hummelshain (DE); Mathias Trumpp, Ulm (DE)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/373,884

(22) Filed: Apr. 3, 2019

(65) Prior Publication Data

US 2019/0228024 A1     Jul. 25, 2019

Related U.S. Application Data

(63) Continuation of application No. 15/223,640, filed on Jul. 29, 2016, now Pat. No. 10,331,712.

(30) Foreign Application Priority Data

Sep. 9, 2015   (GB) ...................................... 1515951

(51) Int. Cl.
    *G06F 16/00*     (2019.01)
    *G06F 16/29*     (2019.01)
    *G06F 16/22*     (2019.01)

(52) U.S. Cl.
    CPC .......... *G06F 16/29* (2019.01); *G06F 16/2264* (2019.01)

(58) Field of Classification Search
    CPC ............................ G06F 16/29; G06F 16/2264
(Continued)

(56) References Cited

U.S. PATENT DOCUMENTS

| | | | |
|---|---|---|---|
| 6,505,205 B1 * | 1/2003 | Kothuri | G06F 16/2264 |
| 7,383,275 B2 * | 6/2008 | Chen | G06F 16/2264 |
| | | | 707/743 |

(Continued)

OTHER PUBLICATIONS

Zone Maps—Oracle Database Data Warehousing Guide 12c Release 1 (12.1), Jul. 2014, http://docs.oracle.com/database/121/DWHSG/zone_maps.htm, 26 pages.

(Continued)

*Primary Examiner* — Chelcie L Daye
(74) *Attorney, Agent, or Firm* — Steven Bouknight; Edell, Shapiro & Finnan, LLC (57) ABSTRACT

The present disclosure relates to a method for processing data blocks of a data table. The data blocks comprise an attribute representing multidimensional spatial data objects, where the attribute has multiple values representing respective dimensions of the multidimensional spatial data object. The method comprises creating for each data block of the data blocks, a respective attribute metadata. The attribute metadata comprises attribute value information defining a multidimensional minimum bounding rectangle that covers attribute values of the attribute comprised in the data block. A query is processed on the multidimensional spatial data objects associated with a query area using the multidimensional minimum bounding rectangle to check whether a data block of the data blocks contains attribute values of the attribute in the query area.

20 Claims, 5 Drawing Sheets

(58) Field of Classification Search
USPC .................................................. 707/724, 743
See application file for complete search history.

(56) References Cited

U.S. PATENT DOCUMENTS

| | | | |
|---|---|---|---|
| 2005/0137994 | A1 | 6/2005 | Fortin et al. |
| 2010/0114905 | A1* | 5/2010 | Slavik .................... G06F 16/29 707/743 |
| 2013/0339371 | A1* | 12/2013 | Hayashi .............. G06F 16/9537 707/743 |
| 2014/0089333 | A1 | 3/2014 | Li et al. |
| 2017/0068688 | A1 | 3/2017 | Brodt et al. |

OTHER PUBLICATIONS

N. Beckmann, H.-P. Kriegel, R. Schneider, and B. Seeger. The R*-tree: An efficient and robust access method for points and rectangles+. In Proceedings of the 1990 ACM SIGMOD International Conference on Management of Data, SIGMOD '90, pp. 322-331, New York, NY, USA, 1990. ACM.

J. L. Bentley. Multidimensional binary search trees used for associative searching. Communications of the ACM, 18(9):509-517, Sep. 1975.

A. Guttman. R-trees: A dynamic index structure for spatial searching. In Proceedings of the 1984 ACM SIGMOD International Conference on Management of Data, SIGMOD '84, pp. 47-57, New York, NY, USA, 1984. ACM.

J. A. Hartigan and M. A. Wong. Algorithm as 136: A k-means clustering algorithm. Journal of the Royal Statistical Society, Series C (Applied Statistics), (28):100-108, 1979.

J. R. Herring. OpenGIS implementation standard for geographic information—simple feature access—part 2: Sql option. OpenGIS Implementation Standard OGC06-104r4, Open Geospatial Consortium Inc., Aug. 2010, 111 pages.

D. Hilbert. Über die stetige Abbildung einer Linie auf ein Flächenstück. Mathematische Annalen, 38:459-460, 1891.

S. Idreos, M. Kersten, and S. Manegold. Database cracking. In Conference on Innovative Data Systems Research (CIDR), 2007, 11 pages.

M. Kersten and S. Manegold. Cracking the database store. In Conference on Innovative Data Systems Research (CIDR), 2005, 12 pages.

J. Nievergelt, H. Hinterberger, and K. C. Sevcik. The grid file: An adaptable, symmetric multikey file structure. ACM Transactions on Database Systems, 9(1), Mar. 1984, pp. 38-71.

H. Tropf and H. Herzog. Multidimensional range search in dynamically balanced trees. http://www.vision-tools.com/h-tropf/multidimensionalrangequery.pdf. Angewandte Informatik (Applied Informatics), Feb. 1981, pp. 71-77. Vieweg Verlag, Wiesbaden, Germany.

List of IBM Patents or Patent Application Treated as Related, filed Apr. 4, 2019.

* cited by examiner

EFFICIENT SPATIAL QUERIES IN LARGE DATA TABLES

BACKGROUND

The present invention relates to the field of digital computer systems, and more specifically, to processing data blocks of a data table.

Analytical database systems manage very large amounts of data and are optimized for queries that must read large fractions of data. The analytical database systems typically evaluate the query predicate on all data blocks by linearly iterating over the data blocks. However, the trend in analytical databases is increasing table sizes ("Big Data") resulting in large data tables, where processing such large data tables is expensive in terms of processing resources.

SUMMARY

Various embodiments provide a method for processing data blocks of a data table, a computer program product and a computer system as described by the subject matter of the independent claims. Advantageous embodiments are described in the dependent claims. Embodiments of the present invention can be freely combined with each other if they are not mutually exclusive.

In one aspect, the invention relates to a computer implemented method for processing data blocks of a data table, the data blocks comprising an attribute representing multidimensional spatial data objects, the attribute having multiple values representing respective dimensions of the multidimensional spatial data object. The method comprises:

creating for each data block of the data blocks a respective attribute metadata, the attribute metadata comprising attribute value information defining a multidimensional minimum bounding rectangle that covers all attribute values of the attribute comprised in the data block; and processing a query on the multidimensional spatial data objects associated with a query area using the multidimensional minimum bounding rectangle to check whether a data block of the data blocks contains attribute values of the attribute in the query area.

In another aspect, the invention relates to a computer program product for processing data blocks of a data table, the data blocks comprising an attribute representing multidimensional spatial data objects, the attribute having multiple values representing respective dimensions of the multidimensional spatial data object. The computer program product comprises a computer readable storage medium having program instructions embodied therewith, the program instructions executable by a processor to:

create for each data block of the data blocks a respective attribute metadata, the attribute metadata comprising attribute value information defining a multidimensional minimum bounding rectangle that covers all attribute values of the attribute comprised in the data block; and process a query on the multidimensional spatial data objects associated with a query area using the multidimensional minimum bounding rectangle to check whether a data block of the data blocks contains attribute values of the attribute in the query area.

In another aspect, the invention relates to a computer system for processing data blocks of a data table, the data blocks comprising an attribute representing multidimensional spatial data objects, the attribute having multiple values representing respective dimensions of the multidimensional spatial data object. The computer system is configured for:

creating for each data block of the data blocks a respective attribute metadata, the attribute metadata comprising attribute value information defining a multidimensional minimum bounding rectangle that covers all attribute values of the attribute comprised in the data block; and processing a query on the multidimensional spatial data objects associated with a query area using the multidimensional minimum bounding rectangle to check whether a data block of the data blocks contains attribute values of the attribute in the query area.

BRIEF DESCRIPTION OF THE DRAWINGS

In the following, embodiments of the invention are explained in greater detail, by way of example only, making reference to the drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To date, analytical database systems typically evaluate the query predicate on all data blocks by linearly iterating over them. The trend, however, in analytical databases is increasing table size (Big Data). This is expensive in terms of processing resources. Additionally, in case of range queries, sorting data blocks by minimum values is not enough as it disregards the maximum value. Further, two separate sorted lists for min and max would double maintenance effort and memory requirements.

The minimum bounding rectangle (MBR) is an expression of the maximum extents of a 2-dimensional object (e.g., point, line, polygon) or a set of objects within its (or their) 2-D (x, y) coordinate system, in other words min(x), max(x), min(y), max(y). The MBR is a multidimensional case of the minimum bounding box or multidimensional minimum bounding rectangle. The multidimensional minimum bounding rectangle or minimum bounding box, is an expression of the maximum extents of a multi-dimensional object.

The term "spatial data" refers to the representation of multi-dimensional data objects, such as points, lines and surfaces, as a list of numbers using a particular coordinate system.

The terms "spatial data objects", "data objects", and "objects" are used interchangeably herein. The terms "data blocks" and "blocks" are used interchangeably herein.

The query area refers to an area for which a user requests data. For example, the query area may be defined by two or more range searches based on selections on two or more values that correspond to different dimensions of the spatial objects. For example, the query may be received or generated in the form of a SQL statement comprising a WHERE statement that selects or requires data objects having a longitude location between long1 and long2 values and a latitude location between lat1 and lat2 values. In this case, the query area may be a rectangle defined by a lowest left corner (long1, lat1) and an upper right corner defined by the pair (long2, lat2) in a space defined by the two dimensions, longitude and latitude.

The data table may be divided to obtain the data blocks of the data table. According to one embodiment, the dividing of the data table is performed randomly or performed through a preselection criterion using values of the first attribute. The random and preselection based division may particularly be advantageous for the range searches. The random division may be advantageous as it may provide data blocks that can be equally searched by different types of range queries. The preselection based division may be advantageous as it may provide a controlled optimized access to data blocks using predefined queries on the first attribute.

The above features may enable an optimal selection of data blocks of the data table to be accessed without having to fully scan data table content (e.g., on disk). This may preserve processing resources in the computer system (i.e., fewer computer processing resources are required for executing the query). Instead of scanning the full data table, only part of the data table that is required for satisfying the query is scanned. The part of the table comprises the selected data blocks. This may further save processing resources.

For example, the data blocks may be stored on a disk and the metadata attributes may be stored on a memory such that the selection of the (to be processed) data blocks may quickly be performed on the attribute metadata without having to scan every data block on the disk. After selecting data blocks that are relevant for the query, the selected data blocks are scanned or accessed (e.g., on the disk). In another example, the data blocks may be stored in the memory (as in-memory data) and, since only selected data blocks may be processed, the processing time may be saved as well. The present method may thus reduce computational cost even when the data blocks are also stored in memory.

Another advantage may reside in the reduced processing time required by the present method compared to conventional methods.

The term "disk" as used herein may comprise a hard disk drive (HDD), a direct access storage device (DASD) or a logical unit number (lun) in a storage device. The term "disk" is intended to embrace not only magnetic storage devices, but also optical, solid state and other types of storage devices.

According to one embodiment, the method further comprises defining each axis of the multidimensional minimum bounding rectangle of a given data block by the range of values lying between a maximum and a minimum value of the attribute of the given data block along a respective dimension of the multiple dimensions, the attribute value information of the given data block comprising the maximum and minimum values. This embodiment may enable multidimensional range searches on spatial data objects. This embodiment may have the advantages described above.

According to one embodiment, the method further comprises: for each data block of at least part of the data blocks: splitting each axis of the multidimensional minimum bounding rectangle into sub-axes by determining one or more intermediate values that lie between the minimum and maximum values that define the axis, the splitting resulting in cells, each cell being defined by sub-axes; and identifying empty cells of the cells having no attribute values of the attribute, the attribute value information of the given data block comprising the maximum and minimum values, the one or more attribute values and an indication of empty cells; wherein processing the query comprises processing the non-empty cells and excluding the empty cells.

This embodiment may further preserve processing resources, in particular, for processing Big Data with millions of data blocks. This embodiment may further speed up the query processing as empty cells may be skipped.

According to one embodiment, the processing comprises: selecting a data block of the data blocks if the intersection area between the query area and the multidimensional minimum bounding rectangle comprises at least one non-empty cell; and processing the selected data blocks. This may provide an efficient method for selecting data blocks using the attribute metadata and may further save processing resources in comparison to the case where data blocks are selected by comparing the multidimensional minimum bounding rectangle with the query area.

According to one embodiment, in response to determining that a multidimensional minimum bounding rectangle of a data block of the data blocks covers an area larger than a predetermined maximum area: defining for each cell of the multidimensional minimum bounding rectangle a multidimensional minimum bounding rectangle that covers the attribute values of the data blocks that are within the cell; and using the multidimensional minimum bounding rectangles of the cells for processing the query. For processing the query, the cell MBRs of the data blocks may be used in addition to using the multidimensional minimum bounding rectangles of those data blocks. For example, if it is determined that the query area intersects with a multidimensional minimum bounding rectangle of a given data block and that the intersection area comprises non-empty cells, the processing of the query may further comprise comparing the query area with the multidimensional minimum bounding rectangles of the non-empty cells. For example, if the last comparison reveals that the query area overlaps with the multidimensional minimum bounding rectangle of a given non-empty cell in an area that does not comprise attribute values (or data objects), then this cell may be skipped when processing the query to get the query results. This may further speed up the query processing.

According to one embodiment, the splitting is performed in response to determining that the query area is smaller than a predetermined minimum area. For a large query area (e.g., that overlaps most of the data blocks of the data table), the data blocks may be easily selected based on the comparison between the multidimensional minimum bounding rectangles and the query area.

According to one embodiment, the method further comprises: receiving one or more queries to access the data blocks; calculating for each query a ratio of the number of data blocks of the data blocks that contain attribute values that satisfy the query to the number of processed data blocks of the data blocks; and in response to determining that a value derived from the ratios is smaller than a predetermined minimum value, performing the splitting. The value derived from the ratios may comprise a ratio of the calculated ratios. In another example, the value derived from the ratios may comprise the average of the calculated ratios.

For example, for every query with a spatial predicate, the number of data blocks that actually did contain at least one row matching the predicate may be put in relation to the number of data blocks which the query had to scan due to attribute metadata. The value of the ratios may indicate a false positive rate of false positive data blocks that, for example, overlap with the query area without having data objects that satisfy the query.

According to one embodiment, the one or more intermediate values are randomly determined. This may have the advantage of speeding up the process of splitting compared to the case where the one or more determined values may be calculated according to criteria.

According to one embodiment, the one or more intermediate values are determined such that the cells of a data block of the data blocks are equi-sized cells. This may enable a uniform processing of the data blocks and may speed up the processing of the query as the access to a given cell of a the data block may enable predicting the values that define the remaining cells of the data block without having to read for each cell the associated values that define the cell.

According to one embodiment, the method further comprises for each data block: determining the density of the attribute values of the attribute of the data block inside the multidimensional minimum bounding rectangle; and determining the one or more intermediate values for an axis of the multidimensional minimum bounding rectangle based on the density of the attribute values. This may be referred to as a clustering embodiment. This embodiment may provide an accurate splitting of the multidimensional minimum bounding rectangle. This embodiment may have a high probability of providing empty cells compared to a random splitting. This may further save processing resources as less cells may be processed compared to the random splitting.

According to one embodiment, the method further comprises: generating a multidimensional data structure for representing the data blocks; for each data block of the data blocks, adding a respective data element into the multidimensional data structure, the data element having the attribute value information of the respective data block; and processing the query using the multidimensional data structure.

The term multidimensional data structure refers to a data structure for indexing multidimensional information. The multidimensional data structure may, for example, represent a map that is viewed as a two dimensional image, wherein points on the map are stored as data elements on the multidimensional data structure. The multidimensional data structure may comprise a spatial index. The multidimensional data structure supports various types of queries (e.g., a range query). The range query retrieves all tuples of a multidimensional space matched by a query rectangle.

In one embodiment, the multidimensional data structure comprises a spatial index. The spatial index may be used to divide the indexed space (space defined by the dimensions of the spatial data objects and covering the data elements of the spatial index) into search rectangles (or index rectangles) each comprising a respective number of data elements. Using this data structure, only search rectangles that are covered by the query area may be searched. A search rectangle is either completely contained in, partially overlapping with, or disjoint with the query area. If a search rectangle is contained in the query area, then all its contained data elements are part of the query result. As no individual evaluation may be required, a big improvement over the conventional evaluation methods may be reached. Data elements in search rectangles that the query area partly covers may be evaluated individually. Search rectangles that are disjoint with the query area may be ignored.

According to one embodiment, processing the query comprises: selecting data elements of the multidimensional data structure whose multidimensional minimum bounding rectangles overlap the query area; and processing the data blocks corresponding to the selected data elements for the query.

According to one embodiment, the multidimensional spatial data object specifies the spatial coordinate, the spatial coordinate comprising one of: north, east, south, west directions; and latitude, longitude and elevation.

The attribute metadata of a given data block may be represented by a single entry in the multidimensional data structure. Thus, instead of performing multiple selections on multiple entries of each data block, the present method may enable a single selection on entries of the multidimensional data structure where a single entry is associated with each data block. This may further preserve processing resources, in particular, for processing Big Data with millions of data blocks.

Figure 1:
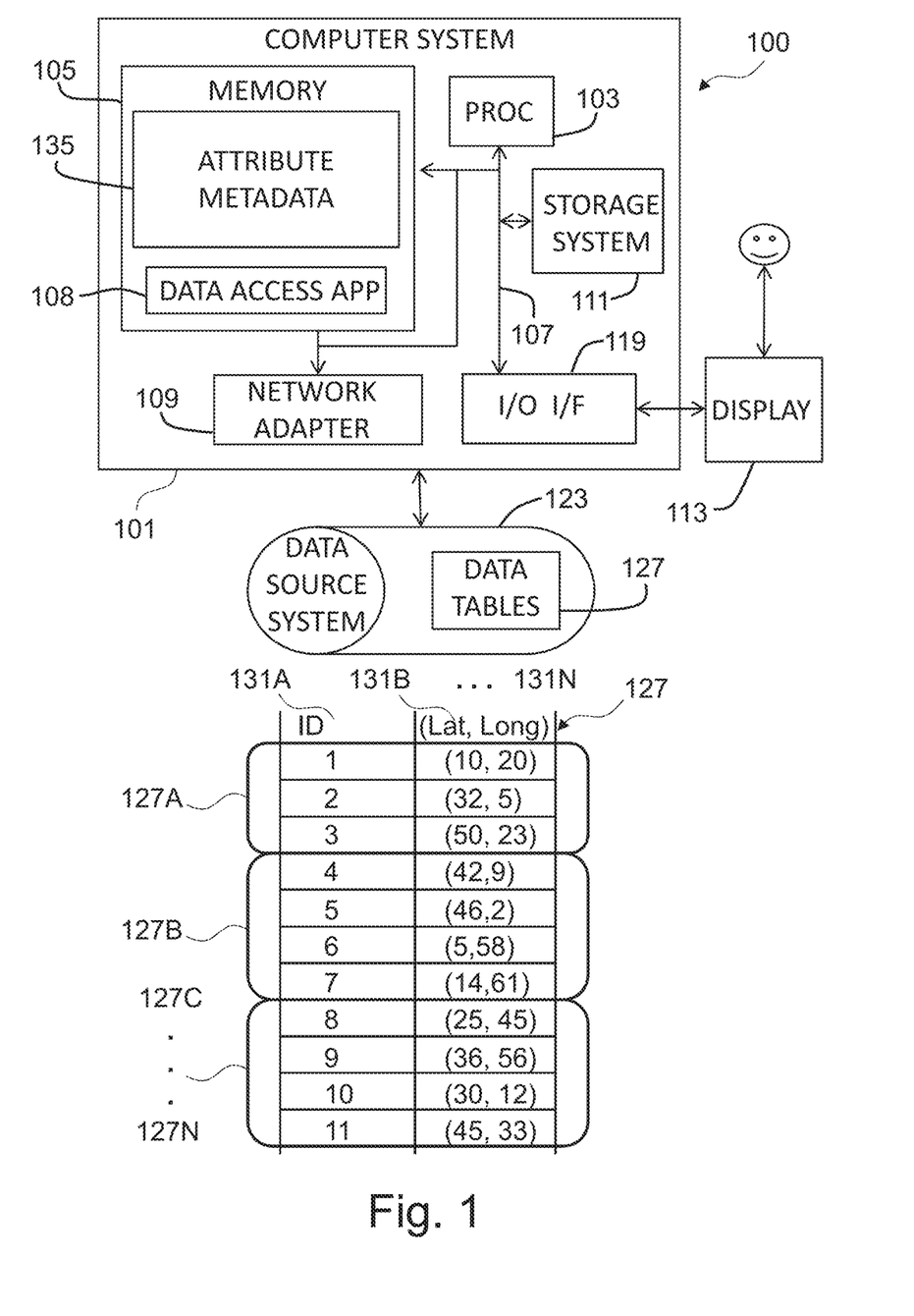
FIG. 1 depicts a functional block diagram illustrating a data processing system.

FIG. 1 depicts a functional block diagram illustrating a data processing system or computer system 100 according to an example embodiment of the present invention.

The data processing system 100 comprises a computer system 101. The components of computer system 101 may include, but are not limited to, one or more processors or processing units 103, a storage system 111, a memory unit 105, and a bus 107 that couples various system components including memory unit 105 to processor 103. Storage system 111 may include for example a hard disk drive (HDD). Memory unit 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as: a keyboard, a pointing device, a display 113, etc.; one or more devices that enable a user to interact with data processing system 100; and/or any devices (e.g., network card, modem, etc.) that enable data processing system 100 to communicate with one or more other computing devices. Such communication can occur via I/O interface(s) 119. Still yet, computer system 101 can communicate with one or more networks such as a local area network (LAN), a general wide area network (WAN), and/or a public network (e.g., the Internet) via network adapter 109. As depicted, network adapter 109 communicates with the other components of computer system 101 via bus 107.

Memory unit 105 is configured to store applications that are executable on the processor 103. For example, the memory system 105 may comprise an operating system as well as application programs. The application programs comprise a data access application 108 (e.g., a database application). The data access application 108 may have access to one or more data tables 127. For example, the data access application 108 may receive (automatically or upon request) as inputs the data table 127, or may download the data table 127 from data source system 123.

The data processing system 100 may further comprise data source system 123. The data source system 123 may for example comprise a Hadoop platform. The data source system 123 may provide and store data table 127. The data source system 123 is connected to the computer system 101 via one or more networks for example, the Internet, a local area network, a wide area network and/or a wireless network.

In addition or alternatively, the data table 127 may be stored on the storage system 111 and/or memory unit 105.

Data source system 123 may support, for example, different storage models or techniques such as relational, columnar, graph, etc. that are representative for persistent repositories used to store data.

The data table 127 may be configured to store data that represents objects defined in a geometric space, such as points, lines, polygons or more complex structures, such as 3D objects, topological coverages, etc.

The data table 127 may comprise one or more columns 131A-N, wherein each column is represented by a respective attribute. For example, column 131A may comprise values of spatial object IDs, and column 131B may comprise values of a location attribute of the spatial data objects. For example, the spatial objects may be two-dimensional data objects whose location attribute may have values indicating longitude and latitude locations of the spatial objects. Each of the two values, longitude and latitude, represents a respective dimension of the two-dimensional data object. In another example, the spatial objects may be three-dimensional data objects whose location attribute may have values indicating longitude, latitude and elevation locations of the spatial objects. For simplicity of the description, only two dimensions are described with reference to FIG. 1.

The column 131B may comprise pairs of values (lat, long) that are the values of the latitude and longitude locations or coordinates of a spatial object. For example, a spatial object having ID 5 has geographical coordinates (lat=46, long=2). The values of the location attribute are shown as contained in a single column 131B; however, the values of the location attribute may be stored in one or more columns. For example, the values of the location attribute may be stored in respective columns (e.g., the latitude and longitude values may be stored in respective columns 131B-131C).

The data table 127 may comprise multiple data blocks 127A-N. For example, data blocks 127A-N may contain an equal or unequal number of rows of the data table 127. The data blocks 127A-N may have no common rows of the data table 127. The data blocks 127A-N may be separated from each other based on values of the location attribute of the data table 127. In another example, the data blocks 127A-N may be obtained as a result of a random division of the data table 127.

The operation of the data processing system 100 will be described in details with reference to FIGS. 2-5.

Figure 2:
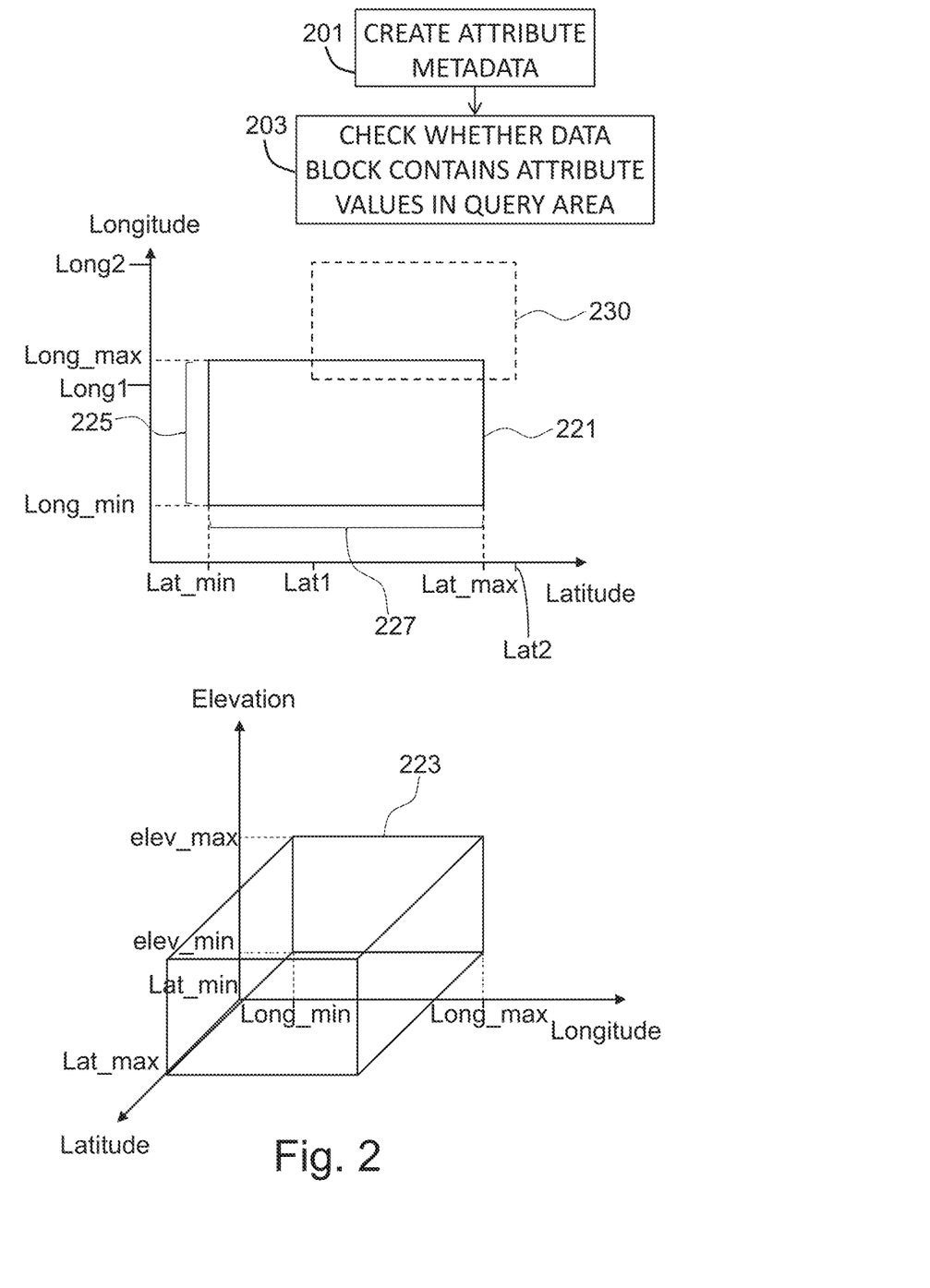
FIG. 2 is a flowchart of a method for processing data blocks of a data table.

FIG. 2 is a flowchart of a method for processing data blocks 127A-N of the data table 127. The processing may, for example, comprise reading or analyzing the content of at least part of the data blocks 127A-N.

In step 201, for each data block of the data blocks 127A-N, a respective attribute metadata 135 may be created. The attribute metadata 135 may, for example, be stored in memory unit 105. The attribute metadata 135 may comprise attribute value information defining a multidimensional minimum bounding rectangle (or a minimum bounding box) that covers all attribute values of the attribute 131A-N comprised in the data block 127A-N. In other words, the multidimensional minimum bounding rectangle may be defined such that every attribute value of the corresponding data block is within the multidimensional minimum bounding rectangle.

For example, in case the attribute comprises a location attribute, such as attribute 131B, the multidimensional minimum bounding rectangle may be a minimum bounding rectangle that may be defined by two pairs of values of the attribute 131B. The minimum bounding rectangle may refer to an expression of the maximum extents of 2-dimensional data objects of a given data block 127A-N, in other words min(x), max(x), min(y), max(y), where x refers to a longitude location and y refers to a latitude location. For example, the minimum bounding rectangle of data block 127B may be defined by the two pairs of values (lat_min=5, long_min=2) and (lat_max=46, long_max=58). For example, axis or side 225 of minimum bounding rectangle 221 may be defined as a range of values lying between long_min and long_max values. Axis or side 227 of minimum bounding rectangle 221 may be defined as a range of values lying between lat_min and lat_max values.

In another example, the attribute location may represent three dimensional data objects, and may provide latitude, longitude and elevation of the data objects. In this case, a triple of values (latitude, longitude, elevation) may be associated with each data object in the data blocks 127A-N. The multidimensional minimum bounding rectangle 223 may comprise a box defined by lat_min, long_min, elev_min, lat_max, long_max, elev_max which represent respectively minimum and maximum values of the latitude, longitude, and elevation as shown in FIG. 2.

The generated attribute metadata 135 may, for example, be stored in association with data blocks 127A-N in data source system 123. Alternatively, or in addition, the attribute metadata 135 may be stored in the memory unit 105 so as to enable a fast access to the attribute metadata 135. For example, a multidimensional data structure may be used to store the attribute metadata. Each data element or entry of the multidimensional data structure may be associated with a respective data block 127A-N. A data element of the multidimensional data structure may comprise a tuple of values (e.g., lat_min, long_min, lat_max, long_max) that define the multidimensional minimum bounding rectangle. For example, the attribute metadata 135 of data block 127B may comprise the two pairs of values (lat_min=5, long_min=2) and (lat_max=46, long_max=58) that define the minimum bounding rectangle 221.

In step 203, a query on the multidimensional spatial data objects associated with a query area 230 is processed using the multidimensional minimum bounding rectangle 221, 223 to check whether a data block of the data blocks 127A-N contains attribute values of the attribute 131B in the query area 230.

The query may be received from a requester or may be generated (e.g., automatically generated) by a system that performs steps 201-203. The generation of the query may be used, for example, for performing tests (e.g., for estimating processing resources required for processing selected data blocks of the data blocks 127A-N, etc.). As the tests may not require specific or desired queries from users, the query may be automatically generated.

The query area 230 may be the result of a selection condition on the attribute values of the attribute 131B. For example, the query area 230 may be obtained by a selection condition requiring or selecting the data objects having the attribute values latitude and longitude fulfilling the following condition: lat1<latitude<lat2 and long1<longitude<long2. The query area 230 may be a rectangle defined by a lowest left corner (long1, lat1) and an upper right corner defined by the pair (long2, lat2).

By using the generated attribute metadata of a data block 127A-N, a comparison or matching or mapping may be performed between values (e.g., lat_min, long_min, lat_max, long_max) of the attribute metadata 135 with the values (e.g., lat1, long1, lat2, long2) defining the query area 230. In other words, the processing of the query may comprise identifying multidimensional minimum bounding rectangles 221, 223 that overlap with the query area 230. The data blocks that correspond to the identified multidimensional minimum bounding rectangles may be processed for executing the query. This can be done by scanning the attribute metadata 135 linearly, or by looking up the relevant data blocks from the multidimensional data structure. This method may speed up the query process compared to the case where all data blocks have to be scanned.

For example, the data access application 108 may comprise instructions that when executed may perform steps 201-203.

Figure 3:
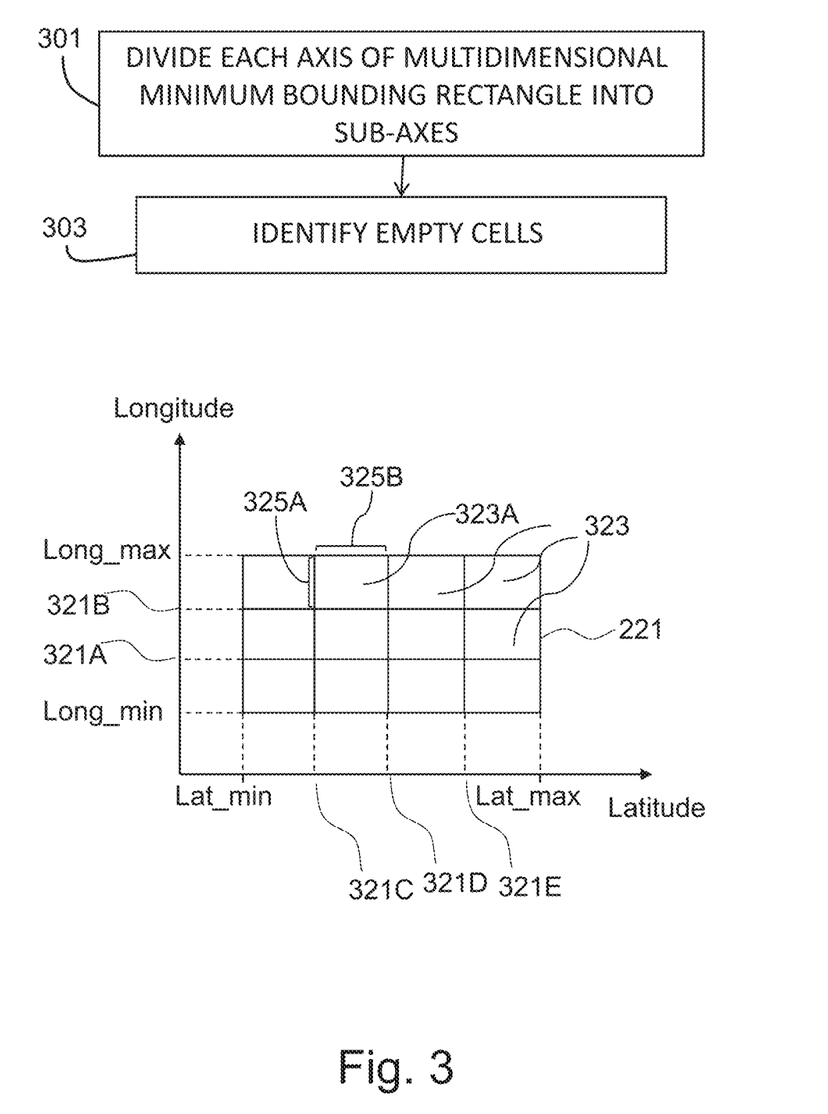
FIG. 3 is a flowchart of an example method for processing a query.

FIG. 3 is a flowchart of an example method for processing a query further detailing step 203.

In step 301, each axis 225 of the multidimensional minimum bounding rectangle 221, 223 of a data block 127A-N may be split or divided into sub-axes. For that, one or more intermediate values 321A-E that lie between the minimum and maximum values that define the axis 225 may be determined. The splitting results in (12) cells 323 with each cell being defined by sub-axes 325. For example, cell 323A may be defined by sub-axes 325A and 325B. For simplicity of the description, FIG. 3 shows the example of minimum bounding rectangle 221 that corresponds to two dimensional data objects.

In one example, the one or more intermediate values 321 may be randomly determined. This may have the advantage of speeding up the process of splitting compared to the case where the one or more determined values may be calculated according to criteria.

In another example, the one or more intermediate values may be determined such that the cells of the data block 127A-N are equally sized cells. This may enable a uniform processing of the data blocks and may be speed up the processing of the query as the access to a given cell of a data block may enable predicting the values that define the remaining cells of the data block without having to read for each cell the associated values that define the cell.

In step 303, empty cells of the cells 323 having no attribute values of the attribute may be identified. For example, cell 323A may be defined by values lat_cell_1=321C, lat_cell_2=321D, long_cell_1=321B and lon_cell_2=long_max as being values of the attribute 131B. If the data block 127B whose minimum bounding rectangle being split has only attribute values (v1, v2) (v1 and v2 are values for the latitude and longitude location) that satisfy v1>lat_cell_2 or v1<lat_cell_1 and v2>long_cell_2 or v2<lat_cell_1, the cell 323A may be identified as an empty cell.

In this example of FIG. 3, the attribute metadata 135 of the data block 127A-N may comprise in addition to the maximum and minimum values (e.g., lat_min, long_min, lat_max, long_max) that define the multidimensional minimum bounding rectangle 221, the one or more attribute values 321A-E and an indication of empty cells 321A. In this way, the attribute metadata 135 may have indications of empty and non-empty cells. Knowing the empty cells of a data block, the query processing of step 203 may skip or exclude the empty cells and only process the non-empty cells in order to define whether the data block 127A-N may contain attributes values that satisfy the query. For example, the data block 127A-N may be processed if the intersection area between the query area 230 and the multidimensional minimum bounding rectangle of the data block 127A-N comprises at least one non-empty cell.

Steps 301-303 may be performed for each data block of at least part of data blocks 127A-N. In one example, steps 301-303 may be performed for each data block of the data blocks 127A-N. In another example, the at least part of the data block 127A-N may be user defined. The method may comprise receiving from a user a selection of the at least part of the data blocks and, for example, steps 301-303 may be performed for data blocks selected by a user of the data processing system 100. In a further example, the at least part of the data blocks 127A-N may be automatically (e.g., randomly) selected from the data blocks 127A-N. The random selection may be advantageous for data analysis having test purposes. In a still further example, the at least part of the data blocks may be selected based on a selection condition (e.g., the at least part of the data block 127A-N may comprise data blocks having a number of entries smaller than a predefined maximum number). This is because the smallest number of entries of a data block produce the highest the number of empty cells and, thus, the processing may be particularly fast for those data blocks.

In case of a mixture of data blocks being split and data blocks not being split, the processing that identifies and takes into account non-empty cells may be performed for the data blocks being split. For the other data blocks not being split, the processing may be performed as described above (e.g., with reference to step 203).

In one example, steps 301 and 303 may be performed in response to determining that the query area 230 of step 203 is smaller than a predetermined minimum area.

For example, the data access application 108 may comprise instructions that when executed may perform steps 301-303.

Figure 4:
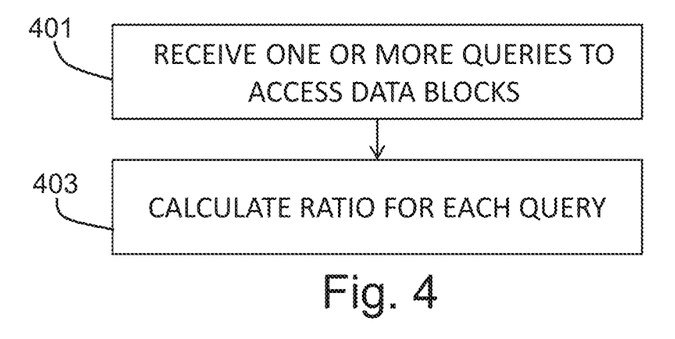
FIG. 4 is a flowchart of an example method for dividing a multidimensional minimum bounding rectangle into cells.

FIG. 4 is a flowchart of an example method further detailing step 301.

In step 401, one or more queries to access the data blocks 127A-N may be received.

In step 403, for each received query, a ratio of the number of data blocks of the data blocks 127A-N that contains attribute values that satisfy the query to the number of processed data blocks of the data blocks 127A-N may be calculated. For example, after receiving a query, the data blocks may be accessed or processed as described with step 203 or step 303. However, it is not guaranteed the data blocks that are selected using the attribute metadata contain attribute values that satisfy the query. This is illustrated, for example, with reference to FIG. 6, where data block b3, although intersecting with the query area (i.e., would then be processed), has no attribute values of spatial objects that lie within the query area.

Step 301 (and 303) that involve the splitting and processing of cells may be executed or performed if the ratio of a query of the one or more queries is smaller than a predetermined minimum value. In another example, steps 301 and 303 may be performed if every calculated ratio of the one or more queries is smaller than the predetermined minimum value. In a further example, steps 301 and 303 may be performed if the average value of the calculated ratios of the one or more queries is smaller than the predetermined minimum value.

Figure 5:
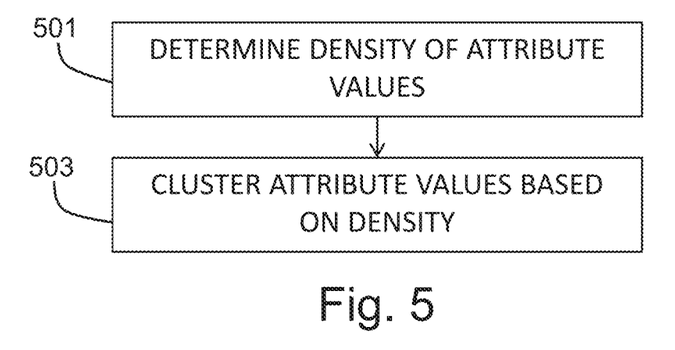
FIG. 5 is a flowchart of a clustering method.

FIG. 5 is a clustering method for defining cells (or clusters) in data block 127A-N further detailing step 301.

In step 501, for each data block, the density of the attribute values of the attribute 131B of the data block 127A-N inside the multidimensional minimum bounding rectangle of the data block is determined. The density may be the number of spatial data objects having attribute values in a given portion of the multidimensional minimum bounding rectangle. For example, the multidimensional minimum bounding rectangle may be divided into multiple regions or portions and the number of data objects (or attribute values of those data objects) that lie within each region may be counted to provide the density.

In step 503, the attribute values may be clustered into one or more clusters based on the determined density, wherein processing the query comprises processing the clusters.

The query area may be compared with the clusters. For that, for example, each cluster may be defined a multidimensional minimum bounding rectangle or a convex hull polygon that covers the attribute values of the data block that are within the cluster. Using the multidimensional minimum bounding rectangle or the convex hull polygon of the cluster, the comparison with the query area may be performed.

For example, the data access application 108 may comprise instructions that when executed may perform steps 401-403 and 501-503.

Figure 6:
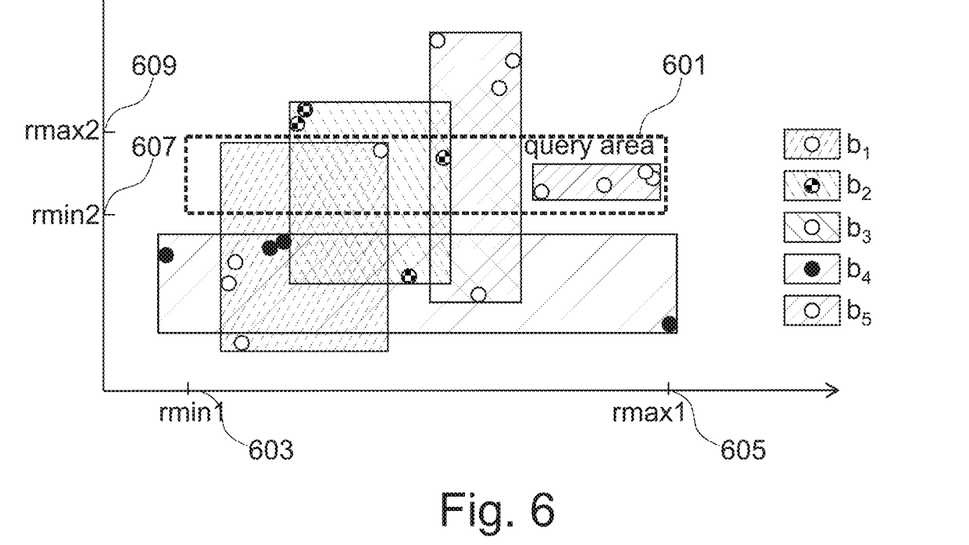
FIG. 6 illustrates an example method for querying spatial data.

FIG. 6 illustrates a further example method for querying spatial data in accordance with the present disclosure. The term dimension refers to a spatial dimension of spatial data.

Instead of having a single pair of [min/max] values per data block that describes an attribute of the data block, multiple pairs [min1/max1,min2/max2, . . . , minn/maxn] may be used so as to describe values of a given attribute of a data table 127. The single pair [min, max] may be used to describe one-dimensional spatial data, while the multiple pairs [min1/max1,min2/max2, . . . , minn/maxn] may be used to describe n-dimensional spatial data. The n pairs may define an n-dimensional minimum bounding rectangle (MBR) in the form of [min1/max1,min2/max2, . . . , minn/maxn] per data block. For example, the given attribute 131B may comprise n sub-attributes each sub-attribute having a respective value. The respective value may have a min/max pair that defines the minimum and maximum values of the sub-attribute. The n pairs may be the values of a data element of a 2n dimensional data structure.

The multidimensional MBR of a data block b on a spatial table column c (e.g., 131B) may be defined as the smallest axis-parallel n-dimensional rectangle that contains all attribute values of the attribute 131B that are stored in b. In the interest of a simpler presentation, assume n=2 in this example, without loss of generality. n=2 is typical for actual spatial data management, however, the present method may equally be applicable for higher numbers of dimensions.

FIG. 6 illustrates the MBRs of five data blocks containing four spatial objects each in two-dimensional space. FIG. 6 further illustrates a query area 601. For example, the query area 601 may be defined by two selections on each dimension of the two dimensional spatial data. For example, mini 603 and maxi 605 define the range cut on the values of the first dimension of the two-dimensional data object, while min2 607 and max2 609 may define a second range cut on the second dimension of the two-dimensional data object. For example, the attribute 131B may comprise a first sub-attribute indicating the longitude and a second sub-attribute indicating the latitude. The two sub-attributes may refer to the two dimensions.

As the MBR may include all dimensions that spatial query predicates refer to, better data block filtering may be possible as compared to the state-of-the-art. In the shown example, the approach to use the MBR of each data block is capable of skipping block b4. By contrast, a conventional method (e.g., where the cutting is performed on a single dimension only) may be incapable of determining that not a single spatial object from b4 lies within the query area 601 that cuts on two dimensions. In addition to that, using the MBR, data blocks can be identified that are entirely contained within the query area 601, so that row-by-row evaluation of each contained spatial object is not required. Block b5 illustrates this.

The example shown with reference to FIG. 6 may enable efficient spatial queries in analytical database systems.

Figure 7:
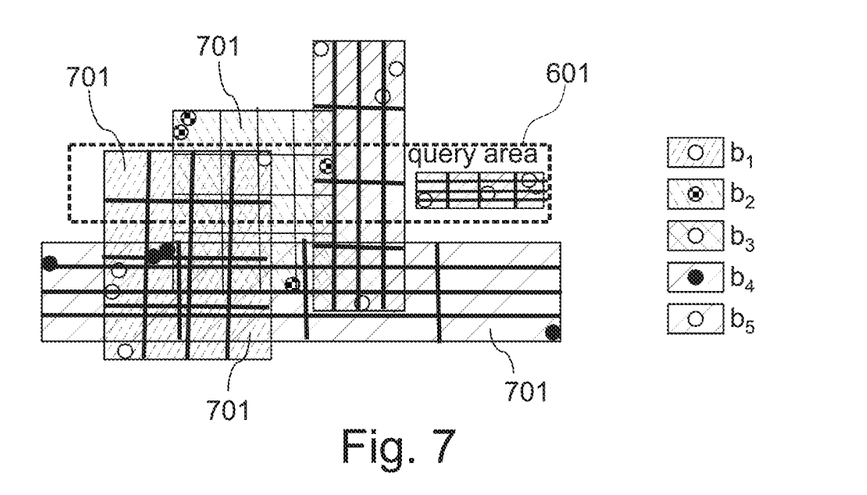
FIG. 7 illustrates a further example method for querying spatial data.

FIG. 7 illustrates a further example method for querying spatial data in accordance with the present disclosure. FIG. 7 illustrates data blocks subdivided into cells in accordance with the present disclosure. FIG. 7 illustrates an approach that equally divides every dimension into four quarters this resulting in 16 equi-sized cells 701.

Plain usage of the multidimensional MBR may not take into account empty areas within the min/max range of the dimensions that define each multidimensional MBR. The multidimensional MBR of block b3 in FIG. 6, for instance, overlaps with the query area 601 even though no spatial object of b3 is in the query result. Thus, block b3 remains a false positive that would be scanned in vain. For example, a data block that solely includes the values 0, 1, 99 and 100 will be scanned for the query predicate BETWEEN 40 AND 60. The problem with empty areas is, however, particularly relevant for spatial data, because outliers leading to large multidimensional MBRs are utterly typical.

Consider, as an example, the area of France which includes Corsica, Martinique Island, and French Guiana. To address empty spaces in the multidimensional MBR of a data block, an approximation of the spatial distribution of objects within the multidimensional MBR may be performed. To achieve this in a computationally inexpensive manner is to subdivide every multidimensional MBR into a fixed number of cells, as illustrated in FIG. 7, and to record for every cell whether it is empty or not. The information whether or not a cell is empty can be stored in a single bit. Thus, powers of two are suitable numbers to subdivide every dimension. FIG. 7 divides the MBRs into four quarters along every dimension resulting in 16 bits of cell information in two-dimensional data. Likewise, a suitable subdivision would be 8 for 64 bits of cell information, which is a "natural" or practical bit length for a processor register.

It depends on the typical size of the query area compared to the typical size of the multidimensional MBRs whether or not the spatial distribution of objects within their multidimensional MBRs may be useful or not. If the query area is a lot larger, then the distribution is only interesting along the edge of both the query area and the multidimensional MBRs. Contrarily, if the query area is small, knowing the distribution in more detail is very useful, as illustrated in FIG. 7 for block b3.

To anticipate this, a flexible adaptive approach to approximate the spatial distribution within a multidimensional MBR may be used. If the data and query characteristics are known beforehand, the appropriate model can be specified directly. In other cases, including query characteristics changing over time, a method for determining the false positives rate p (which is referred to as ratio in FIG. 4) may be used. Thus, for every query with a spatial predicate p, the number of data blocks that actually did contain at least one row matching p is put in relation to the number of blocks which the query had to scan due to attribute metadata:

$$\rho = \frac{\text{\# blocks containing matches}}{\text{\# scanned blocks}}$$

Ideally, $\rho=1$ (i.e., only data blocks are scanned which contain matching rows). If $\rho$ is low for many queries, it may be beneficial to model the spatial distribution within the multidimensional MBRs at higher detail. This can be done automatically, with the next reorganization of the table, or just an indication for the database administrator can be generated.

In the following, some detailed examples in accordance with the present disclosure are provided.

Creating Attribute Metadata

Typically, analytical database systems (e.g., data processing system 100) insert and update data in append-only fashion. Thus, existing rows can be deleted, but to update them, a new row is appended at the end (and update-in-place is not supported consequently), and there is one "tip" block (or more generally a small set of tip blocks) at the end into which new rows are inserted. For this reason, the present method may maintain the multidimensional MBR with every spatial object that is inserted into a tip block. Yet, the spatial distribution within the multidimensional MBR is not yet determined. Only when a tip block is full, all spatial data objects in the data block are analyzed to model the distribution. This is because, depending on the way the distribution is modelled, every insertion of a new object may require re-computing the distribution by re-scanning all spatial objects of the data block.

In one example, the method may comprise re-computing everything (e.g., re-generating or re-creating the attribute metadata as described above for a data block) each time a new object is inserted in the data block. In another example, an efficient computation may be performed, where no attribute metadata information is gathered or generated at load or insert time. Only when a spatial query predicate hits the respective column (e.g., attribute 131B), the attribute metadata is computed with the full scan that the query must perform anyway, as no attribute metadata may allow it to skip any data blocks (naturally, the query can also just mark (parts of) the column for a background process to create the attribute metadata). Finally, this can also be done in a hybrid approach. If a data block b does have its multidimensional MBR described by the attribute metadata, the distribution within b is only computed when a spatial query predicate has first matched the multidimensional MBR.

Spatial Distribution Within the Multidimensional MBR

To address empty spaces in the multidimensional MBR of a data block, an approximation of the spatial distribution of objects within the multidimensional MBR may be used. Also, the present method may implement several levels of detail to balance the effort of computation of, and query evaluation on, the attribute metadata versus their accuracy and efficiency.

Grid Cells

In order to provide this distribution in a computationally inexpensive manner, every multidimensional MBR may be subdivided into a fixed number of grid cells. FIG. 7 illustrates an approach to this that equally divides every dimension into four quarters, thereby resulting in 16 equi-sized cells. In addition to the multidimensional MBR, it may be recorded for every cell whether it is empty or not. Thus, if the query area overlaps with the multidimensional MBR of block b, but the query area does not fully include the multidimensional MBR, it is subsequently checked whether the query area overlaps with a non-empty cell of b. If this is not the case, then b can safely be skipped, as it does not contain spatial objects in the query area. In the example of FIG. 7, block b3 can be skipped using this approach, because the query area only overlaps empty cells of b3.

If r is a practical bit length in the targeted processor hardware, then each of the n dimensions should be subdivided into f equi-width fractions, where $f \leq \sqrt{r}$. The grid cell approach can be implemented using several levels of detail by increasing f to create a finer grid with more cells.

Area Within Grid Cells

Figure 8:
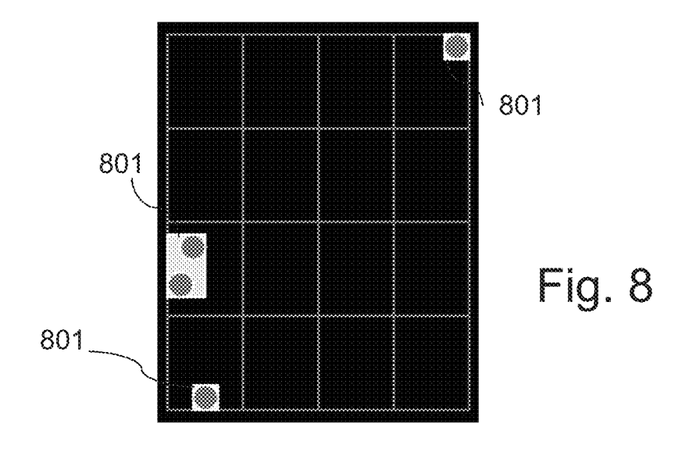
FIG. 8 illustrates multidimensional minimum bounding rectangles for cells within a multidimensional minimum bounding rectangle of a data block.

In case of very large multidimensional MBRs, the cells may become very large and may contain lots of empty space in case of very skewed spatial data. Thus, to improve the approximation of the spatial data distribution within a multidimensional MBR, the content of each grid cell may be approximated. To do this, the minimal axis-parallel bounding rectangle of all spatial objects of the blocks that overlap a cell may be recorded, thereby resulting in a cell MBR. FIG. 8 illustrates the cell MBRs 801 of all non-empty grid cells for block b1 of FIG. 6. The cell MBRs 801 are part of the attribute metadata of a data block (e.g., b1). This, however, does not necessarily mean that they are stored together with the multidimensional MBR or cell information in one place.

The cell MBRs 801 can be efficiently computed from the individual multidimensional MBRs of all spatial objects overlapping a cell. Note the difference between "overlap" and "within", where a single object may overlap several cells, in which case its MBR may be considered in all of these cells. Moreover, multi-geometries, such as the multi-polygon modelling the area of France, require special consideration. Multi-geometries first have to be decomposed into their "primitive" geometries before their MBR is used to compute the cell MBRs. In the example of France, this would mean to consult the MBRs of the French mainland and the islands separately, rather than having one huge MBR covering most of the Atlantic ocean.

An alternative way to model the spatial distribution at higher detail is to compute the convex hull polygon of all spatial objects overlapping a cell. This may be more expensive than the cell MBR, but may yield higher accuracy (e.g., in case the objects are arranged diagonally). Similar to cell MBRs, multi-geometries should be decomposed before computing the hull polygon.

Clustering

The spatial distribution of data objects within a multidimensional MBR can, as an alternative to grid cells, also be approximated by describing a number of spatial clusters. Instead of dividing the multidimensional MBR equally into grid cells, clustering identifies groups of co-located spatial objects and treats them as a single object. To model the distribution in a multidimensional MBR, a fixed number k of clusters can be identified for each data block. Existing cluster algorithms, such as k-means, can be used for this. Similar to the cell-based approaches above, multi-geometries should be decomposed before computing the clusters. The distribution can then be modelled by storing the multidimensional MBR of the k clusters or, alternatively, their convex hull polygons.

For example, other methods to group or index spatial objects within a given area can be applied to approximate the spatial distribution within a multidimensional MBR. Hierarchies, such as the search nodes of an R-tree or R*-tree can be used, just like space-filling curves.

Spatial Index for Multidimensional MBRs

As described above, the multidimensional MBRs may be maintained in a spatial index to speed up searching relevant data blocks for a spatial query predicate. A spatial index that is capable of managing rectangles can be used for this, including R-trees, R*-trees, grid files, UB-trees, KD-trees and so forth. The spatial index is capable of finding the relevant (according to the multidimensional MBR) data blocks very quickly compared to linear search. On the other hand, it is not as expensive to build and maintain compared to a spatial index on all spatial objects of a column. It may thus be a well-balanced compromise between index maintenance cost and query run time cost.

Query Execution

When a spatial query enters the system, the attribute metadata are consulted to find the relevant data blocks as described below for different query areas.

Query Area is an Axis-Parallel Rectangle

For a received query that is associated with a query area that is an axis-parallel rectangle, the computer system 101 may execute the following steps:

1. Identify data blocks with a multidimensional MBR overlapping the query area. This can be done by scanning the attribute metadata linearly, or by looking up the relevant data blocks from a spatial index, as described above.
2. Check for every data block b whether the multidimensional MBR is entirely contained in the query area. In this case, b only contains matching spatial objects. If the system's execution infrastructure supports this, all rows pertaining to b can be directly included in the (intermediate) query result. Row-by-row evaluation is not necessary. This step may be optional or omitted. If omitted, then the above check multidimensional MBR contained in query area is saved, and a row-by-row evaluation may then be used.
3. Examine the approximated distribution of spatial objects within the multidimensional MBR of all data blocks b with a multidimensional MBR that overlaps the query area, but that is not fully contained in it (e.g., if step 2 was omitted, all overlapping blocks are examined). If the distribution is not available for b, the system must scan b for the query. If the distribution is available, the system inspects the intersection of the multidimensional MBR with the query area and considers three cases:
(a) If the intersecting area is empty, b can be ignored for the query.
(b) If the intersecting area includes all spatial objects of b, then all rows of b belong to the result. Row-by-row evaluation may not be necessary (this can also be determined by testing whether the multidimensional MBR minus the query area is empty, according to the modelled spatial distribution).
(c) Otherwise, b may be scanned for matching spatial objects.

Query Area is Arbitrary Polygon

If the query area is not an axis-parallel rectangle but an arbitrary polygon, the query area is first approximated by its minimum bounding rectangle, MBRq. The computer system 101 then performs the following steps:

1) Identify data blocks with a multidimensional MBR overlapping MBRq.
2) Discard all data blocks that (a) are not fully contained in MBRq and (b) where the intersection of the multidimensional MBR and MBRq is empty, according to the modelled spatial distribution. This test may be cheaper in terms of processing resources than comparing the multidimensional MBR with the actual query area particularly if the grid cell approach is used.
3) Check for every data block b whether the multidimensional MBR also overlaps the actual query area.
4) Continue with above step 2 using the actual query area rather than MBRq.

The (polygon) query area may be associated, for example, with the following query statement:

```
SELECT *
FROM myTable t
WHERE ST_Within(
  t.currLocation,
  ST_GeomFromText('POLYGON((0 0, 2 0, 2 2, 0 2, 0 0))')
);
```

The spatio-temporal (ST) SQL Extensions which define the appropriate functions may be used. Note that the polygon is closed by repeating the first coordinate point in the last position. Also, the direction of the point sequence is counter-clockwise.

Organizing Keys

As another method to address the high degree of skew in typical spatial data sets, organizing keys may be used on spatial data. Organizing keys in analytical database systems may cause the data to be stored on disk not in the order of arrival (which is usually the default for such systems), but in an order that makes the collection or the creation (e.g., step 201) of the attribute metadata most effective. For example, defining an organizing key on a single column c 131B could cause the data rows to be ordered by c, so that query predicates on c can exploit maximal benefits of the attribute metadata collection method. To support organizing keys on spatial columns, a spatial sort may be used. Thus, to organize the data on a spatial column s of a database table t, a scalar value is computed for every spatial object in s (e.g., using a space filling curve, such as the Z-curve or the Hilbert curve). The scalar value then determines the order in which the rows oft are stored on disk.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for processing data blocks of a data table, the data blocks comprising an attribute representing multidimensional spatial data objects, the attribute having multiple values representing respective dimensions of a multidimensional spatial data object, the computer program product comprising a computer readable storage medium having program instructions embodied therewith, the program instructions executable by a processor to:

create for each data block of the data blocks a respective attribute metadata, the attribute metadata comprising attribute value information defining a multidimensional minimum bounding rectangle that covers attribute values of the attribute comprised in the data block;

split the multidimensional minimum bounding rectangle of each data block into cells defined by axes with intermediate values that lie between minimum and maximum values defining the minimum bounding rectangle for that data block;

identify empty cells of the minimum bounding rectangle of each data block lacking values of the attribute, wherein the attribute value information of each data block comprises an indication of the empty cells;

process a query on the multidimensional spatial data objects associated with a query area defined by a plurality of range searches by processing cells of the multidimensional minimum bounding rectangle of the data blocks limited to cells containing values of the attribute to select the data blocks containing attribute values of the attribute in the query area to retrieve results for the query.

2. The computer program product of claim 1, wherein the program instructions are further executable by the processor to:
define each axis of the multidimensional minimum bounding rectangle of a given data block by a range of values lying between a maximum and a minimum value of the attribute of the given data block along a respective dimension of multiple dimensions, the attribute value information of the given data block comprising the maximum and minimum values of the attribute of the given data block.

3. The computer program product of claim 2, wherein the program instructions are further executable by the processor to, for each data block of at least part of the data blocks:
split each axis of the multidimensional minimum bounding rectangle into sub-axes by determining one or more intermediate values that lie between minimum and maximum values that define the axis, the splitting resulting in the cells, with each cell being defined by sub-axes;
wherein the attribute value information of the given data block comprising the maximum and minimum values of the attribute, one or more attribute values, and an indication of the empty cells.

4. The computer program product of claim 1, wherein processing the query further comprises:
selecting a data block of the data blocks if an intersection area between the query area and the multidimensional minimum bounding rectangle comprises at least one non-empty cell; and
processing the selected data blocks.

5. The computer program product of claim 3, wherein the program instructions are further executable by the processor to:
in response to determining that a multidimensional minimum bounding rectangle of a data block of the data blocks covers an area larger than a predetermined maximum area:
define for each cell of the multidimensional minimum bounding rectangle a multidimensional minimum bounding rectangle that covers the attribute values of the data blocks that are within the cell; and
use the multidimensional minimum bounding rectangles of the cells for processing the query.

6. The computer program product of claim 1, wherein the program instructions are further executable by the processor to:
receive one or more queries to access the data blocks;
calculate for each query a ratio of a number of data blocks of the data blocks that contains attribute values that satisfy the query to a number of processed data blocks of the data blocks; and
in response to determining that the ratio is smaller than a predetermined minimum value, perform the splitting.

7. The computer program product of claim 3, wherein the program instructions are further executable by the processor to, for each data block:
determine a density of the attribute values of the attribute of the data block inside the multidimensional minimum bounding rectangle; and
cluster the attribute values into one or more clusters based on the determined density, wherein processing the query comprises processing the clusters.

8. The computer program product of claim 1, wherein the program instructions are further executable by the processor to:
generate a multidimensional data structure for representing the data blocks;
for each data block of the data blocks, add a respective data element into the multidimensional data structure, the data element having the attribute value information of the respective data block; and
process the query using the multidimensional data structure.

9. The computer program product of claim 8, wherein processing the query comprises:
selecting data elements of the multidimensional data structure whose multidimensional minimum bounding rectangles overlap the query area; and
processing the data blocks corresponding to the selected data elements for the query.

10. The computer program product of claim 1, wherein the multidimensional spatial data object specifies a spatial coordinate, and wherein the spatial coordinate comprises one of:
north, east, south, west directions; and
latitude, longitude and elevation.

11. A computer system for processing data blocks of a data table, the data blocks comprising an attribute representing multidimensional spatial data objects, the attribute having multiple values representing respective dimensions of a multidimensional spatial data object, the computer system including a processor being configured for:
creating for each data block of the data blocks a respective attribute metadata, the attribute metadata comprising attribute value information defining a multidimensional minimum bounding rectangle that covers attribute values of the attribute comprised in the data block;
splitting the multidimensional minimum bounding rectangle of each data block into cells defined by axes with intermediate values that lie between minimum and maximum values defining the minimum bounding rectangle for that data block;
identifying empty cells of the minimum bounding rectangle of each data block lacking values of the attribute, wherein the attribute value information of each data block comprises an indication of the empty cells;
processing a query on the multidimensional spatial data objects associated with a query area defined by a plurality of range searches by processing cells of the multidimensional minimum bounding rectangle of the data blocks limited to cells containing values of the attribute to select the data blocks containing attribute values of the attribute in the query area to retrieve results for the query.

12. The computer system of claim 11, wherein the processor is further configured for:
defining each axis of the multidimensional minimum bounding rectangle of a given data block by a range of values lying between a maximum and a minimum value of the attribute of the given data block along a respective dimension of multiple dimensions, the attribute value information of the given data block comprising the maximum and minimum values of the attribute of the given data block.

13. The computer system of claim 12, wherein the processor, for each data block of at least part of the data blocks, is further configured for:
- splitting each axis of the multidimensional minimum bounding rectangle into sub-axes by determining one or more intermediate values that lie between minimum and maximum values that define the axis, the splitting resulting in the cells, with each cell being defined by sub-axes;
- wherein the attribute value information of the given data block comprising the maximum and minimum values of the attribute, one or more attribute values, and an indication of the empty cells.

14. The computer system of claim 11, wherein the processing the query further comprises:
- selecting a data block of the data blocks if an intersection area between the query area and the multidimensional minimum bounding rectangle comprises at least one non-empty cell; and
- processing the selected data blocks.

15. The computer system of claim 13, wherein the processor is further configured for:
- in response to determining that a multidimensional minimum bounding rectangle of a data block of the data blocks covers an area larger than a predetermined maximum area:
  - defining for each cell of the multidimensional minimum bounding rectangle a multidimensional minimum bounding rectangle that covers the attribute values of the data blocks that are within the cell; and
  - using the multidimensional minimum bounding rectangles of the cells for processing the query.

16. The computer system of claim 11, wherein the processor is further configured for:
- receiving one or more queries to access the data blocks,
- calculating for each query a ratio of a number of data blocks of the data blocks that contains attribute values that satisfy the query to a number of processed data blocks of the data blocks; and
- in response to determining that the ratio is smaller than a predetermined minimum value, performing the splitting.

17. The computer system of claim 13, wherein the processor, for each data block, is further configured for:
- determining a density of the attribute values of the attribute of the data block inside the multidimensional minimum bounding rectangle; and
- clustering the attribute values into one or more clusters based on the determined density, wherein processing the query comprises processing the clusters.

18. The computer system of claim 11, wherein the processor is further configured for:
- generating a multidimensional data structure for representing the data blocks;
- for each data block of the data blocks, add a respective data element into the multidimensional data structure, the data element having the attribute value information of the respective data block; and
- processing the query using the multidimensional data structure.

19. The computer system of claim 18, wherein processing the query comprises:
- selecting data elements of the multidimensional data structure whose multidimensional minimum bounding rectangles overlap the query area; and
- processing the data blocks corresponding to the selected data elements for the query.

20. The computer system of claim 11, wherein the multidimensional spatial data object specifies a spatial coordinate, and wherein the spatial coordinate comprises one of:
- north, east, south, west directions; and
- latitude, longitude and elevation.

* * * * *